Figure 1:
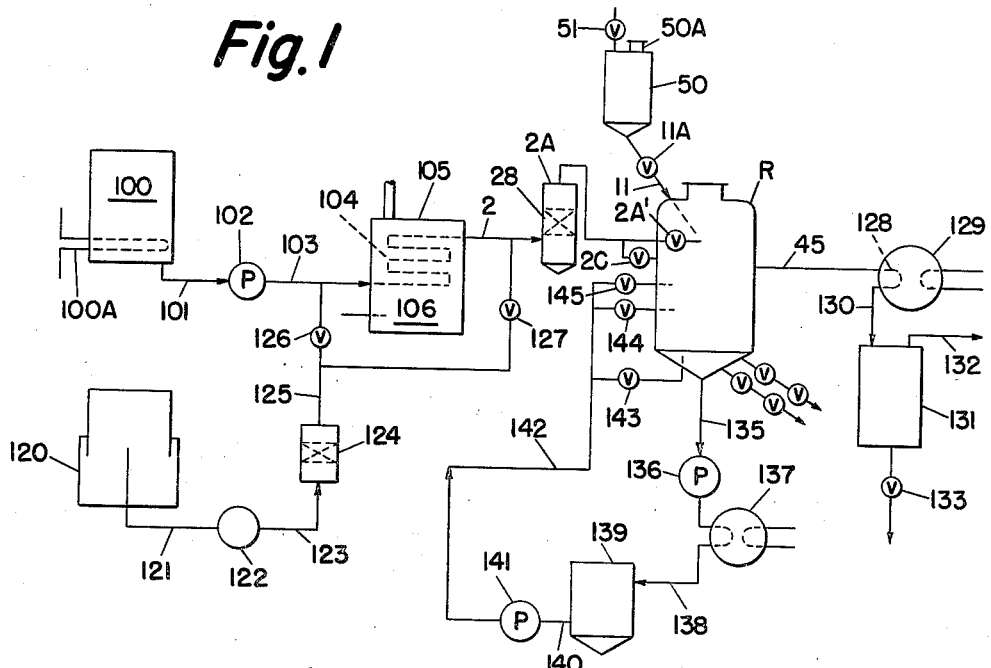

April 4, 1961 H. McCOLLOCH WEIR 2,978,316
PRODUCTION OF ELEMENTS AND COMPOUNDS BY
CONTINUOUS VAPOR PLATING OF PARTICLES
Filed Sept. 14, 1953 2 Sheets-Sheet 1

*INVENTOR.*
HORACE M. WEIR
BY
ATTORNEY

April 4, 1961

H. McCOLLOCH WEIR 2,978,316

PRODUCTION OF ELEMENTS AND COMPOUNDS BY
CONTINUOUS VAPOR PLATING OF PARTICLES

Filed Sept. 14, 1953

2 Sheets-Sheet 2

INVENTOR.
HORACE M. WEIR
BY Joseph Rossman
ATTORNEY

United States Patent Office 2,978,316
Patented Apr. 4, 1961

2,978,316
PRODUCTION OF ELEMENTS AND COMPOUNDS BY CONTINUOUS VAPOR PLATING OF PARTICLES

Horace McColloch Weir, Apt. F10 Brynwood Apt., Wynnewood, Pa.

Filed Sept. 14, 1953, Ser. No. 379,867

21 Claims. (Cl. 75—10)

This invention provides for the production of selected metals or metal like elements in particle form by decomposition of a vapor phase containing a chemical compound of the wanted element and using high temperature energy from an electric arc. The process is particularly well adapted to production of high melting point elements having marked tendency to alloy with other elements such as oxygen, nitrogen and carbon.

Metals in this category which may advantageously be produced by my process are titanium, zirconium, hafnium, boron, silicon and tungsten.

By appropriate variation of my basic process I am able to manufacture useful alloys by my process including various alloys of two or more of the above mentioned elements. Using still other modifications of my process I am able to produce the extremely hard carbides of such elements as titanium, zirconium and tungsten.

Among the advantages which attach to my new process for pure metals production are: (1) continuity of operation and correspondingly high rates of production from relatively small equipment; (2) high purity of product metal; (3) the form of the product simplifies subsequent handling and processing to wanted forms of bulk metal. Other advantages will become apparent from discussion hereinafter. The same advantages together with others are presented by the variations of my process enabling me to manufacture alloys and or carbides of certain metals.

To carry out my metals making process I use suitable known means to convert an ore of the wanted metal to a highly purified salt which may be vaporized without substantial decomposition and which either alone in vapor form or in admixture with hydrogen may be decomposed to yield the wanted free element. The energy and temperature to effect the decomposition is primarily furnished by an electric arc, or arcs, in the presence of suspended particles which serve to distribute the energy over the gas phase and to act as nuclei or precipitation centers for the wanted element. The end result of continuously feeding a decomposable metal-salt-containing gas phase and a proportioned amount of finely divided metal into my process is the production of substantially larger particles of metal, newly created fine particles of metal, and gas having substantially less metal content than the input gas, said product gas being characterized by a substantial content of the free element, or a compound thereof, which element was originally introduced as a chemical component of the metal salt.

Thus, for example, if I choose to make titanium metal I may employ titanium-tetraiodide in vapor form as the gas phase and coincidentally introduce proportioned amounts of finely divided titanium metal. The products in this case will be titanium particles in substantially larger subdivision together with finely divided titanium particles and a gas containing free iodine vapors in an amount chemically corresponding to the difference between the weight of metal produced and the weight of metal introduced into my process.

As an alternate method for producing titanium I may use a proportioned mixture of titanium-tetrachloride vapors and hydrogen as the gas phase continuously introduced into my process. As before a continuous and proportioned amount of finely divided titanium metal is also provided as feed to my process. The products in this case will be titanium particles in substantially larger subdivision, finely divided titanium particles produced from the reduction of the gas phase, and a product gas which contains hydrogen chloride in an amount chemically corresponding to the difference between the total weight of the metal which issues from my process and the weight of metallic titanium introduced thereto.

The two examples just cited illustrate two different forms of my process with one metal product. The first form employs a salt which may be sufficiently decomposed by thermal action alone to yield the wanted product metal. The second form employs a salt which is more difficult to decompose by thermal means alone in which case I employ hydrogen in admixture in order to facilitate the reduction to metal. In the case of production of titanium I usually prefer the second form of my process, on account of the lower cost of titanium tetrachloride and hydrogen as compared to the cost of titanium tetraiodide.

In order to describe my process more explicitly I refer to Figure 1. Tank 100 is the source of supply of titanium salt, kept liquid by use of heating coil 100A if necessary. When I carry out the second form of my process using titanium tetrachloride (and hydrogen) coil 100A is not normally used whereas if I use the first form of my process and employ titanium tetraiodide I use steam or hot oil in heating coil 100A. (Approximate data TiCl$_4$, M.P. −25° C. or lower, B.P 136° C.; TiI$_4$, M.P. 150° C., B.P. above 360° C.). Describing the second form of my process first: Pump 102 draws liquid TiCl$_4$ through pipe 101 forcing it through pipe 103 and heating and vaporizing pipes 104 shown in fuel fired heater 105, in this case, tho I may use a steam heater-vaporizer. Combustion of fuel in zone 106 completely vaporizes the halide salt, continuously, and the vapors flow thru pipe 2, and filter 2A containing, preferably, a packed bed 28 of refractory fibers such as glass fibers or the like. The filter serves to remove any solids such as titanium oxide which may be present from the inadvertent entrance of moisture into the system. The filtered vapors flow forward thru pipe 2 into reactor R.

In this embodiment of my process purified hydrogen gas contained in holder 120 is pumped by compressor 122 thru pipe 121 and 123 into dryer 124.. This dryer serves for practically complete moisture removal and may be provided with a bed of silica gel or activated alumina, according to well known practice. Pipe 125 conducts the substantially dry hydrogen thru one of two branches containing valves 126 and 127. I may open valve 126 and mix hydrogen prior to vaporization of the stream of titanium tetrachloride in pipes 104 or open valve 127 to produce the mixture after TiCl$_4$ vaporization. In either case the rate of hydrogen introduction is regulated in a chosen proportion to the titanium tetrachloride flowing in pipe 2.

Tank 50 with manhead 50A serves as the reservoir for predried particles, preferably metallic titanium. In this embodiment gravity flow of particles is provided the rate of flow being regulated by valve 11A which suffices to deliver the particles to reactor R via pipe 11 at a regulated rate which may be a substantially continuous flow if desired. It is advantageous to prevent the access of air to the particles and I usually provide an inert gas atmosphere in tank 50 which atmosphere may preferably be helium gas or less satisfactorily but also less expensive I may employ hydrogen. Pipe and valve 51 is for removal of air and introduction of inert gas by known means, not shown.

Reactor R will be described subsequently. In continued reference to Fig. 1, 45 is the product gas outlet. The product gas flows thru pipe 128 and thru cooler-condenser 129 adapted to reduce the product gas temperature and condense a regulated large proportion of the $TiCl_4$ vapors carried by the product gas. The two phase mixture flows thru pipe 130 into separator 131 from which the uncondensibles including some $TiCl_4$ vapors, hydrogen and hydrogen chloride flow thru pipe 132. The present invention does not include the processing of said gas mixture to isolate its components and treat same for return to the process in one or another form.

The fraction of the input material to separator 131 which is liquid is removed by means of pipes and valve 133.

From the subsequent description of reactor R it will become apparent that a circulation of liquid titanium tetrachloride may be required for cooling purposes therein. The heated liquid stream emerges from reactor R via pipe 135 under the action of pump 136. This pump forces the liquid thru a cooler, which may be tubular and providing for heat, but not material, exchange with water. This cooler, 137, and pipe 138 serve to replenish the supply of cold liquid $TiCl_4$ contained in tank 139. Pump 141 withdraws the cold liquid from 139 thru pipe 140 forcing it thru pipe 142 and into reactor R at all of three points and in proportions regulated by valves 143, 144 and 145.

This completes the description of elements of my process external to reactor R and adapted to the method of reduction of titanium tetrachloride by hydrogen. Minor modifications of this embodiment, more or less obvious to those acquainted with the art, might be used to adapt it to carrying out the thermal decomposition of titanium tetraiodide in the absence of hydrogen.

In contrast to titanium tetrachloride which is liquid above about −25° C., titanium tetraiodide is liquid only about 150° C. when pure. Likewise whereas $TiCl_4$ boils at about 136° C. $TiI_4$ boils about 360° C.

Accordingly when I employ titanium tetraiodide as reagent for titanium production the temperature levels throughout the system are raised to insure that the compound is liquid at all points and the temperature for vaporization is raised to a higher level than that employed in the hydrogen reduction of $TiCl_4$. Specifically tank 100 is kept heated by steam coil 100A to maintain a temperature well above 150° C. Preferably I steam jacket or steam trace all pipes carrying titanium tetraiodide. The heater 105 is operated to vaporize the compound and hence at an outlet temperature preferably somewhat higher than 360° C. Separator 131 and tank 139 are preferably provided with closed steam coils to maintain temperature of the contents well above 150° C. These heating coils are not shown in Fig. 1 but may be of any suitable known type. An essential difference is, of course, that the hydrogen supply system is not utilized, or in terms of description of Fig. 1, valves 126 and 127 remain closed at all times. Finally it may be stated that the product gas emerging thru pipe 132 contains free iodine and that to avoid difficulties in solidification the temperature is preferably held above 115° C. For trouble free operation it is preferable to avoid the use of a cooling agent which may inadvertently cause freeze ups in coolers 129 and 137. Accordingly I prefer to use steam as the cooling agent in each of these coolers or an oil in liquid phase which is regulated to insure that its temperature remains above 150° C. at all times during operation.

Figure 2:
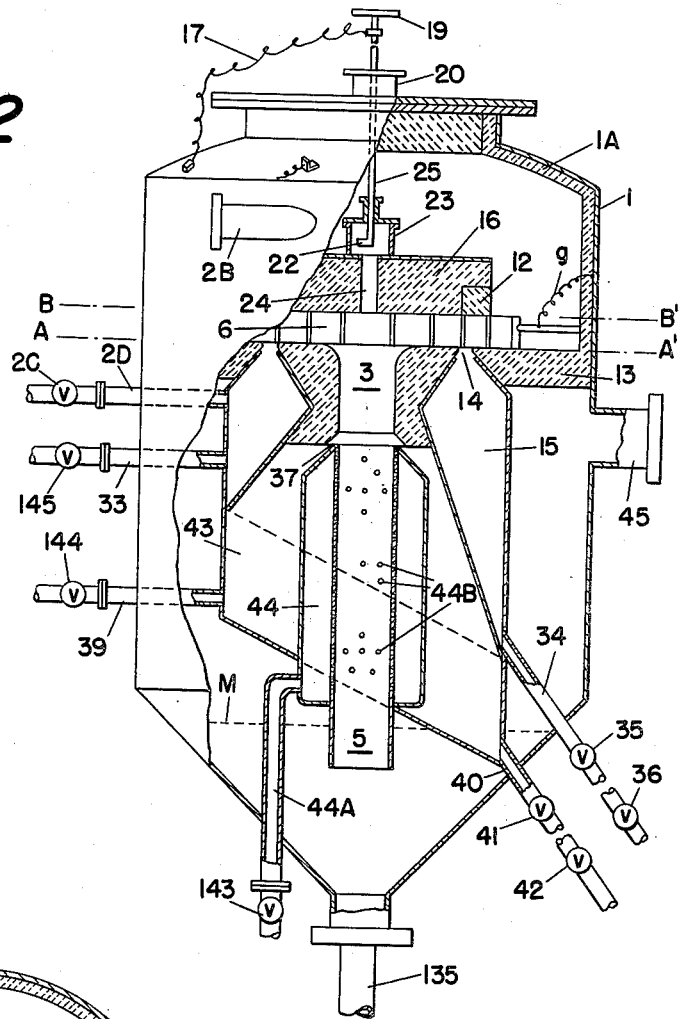
Figure 2A:
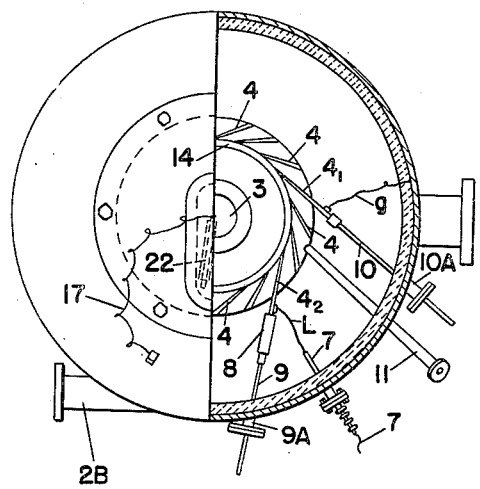

Having now described features of my process in one embodiment thereof, and which are external to the reactor R, I will now describe one embodiment of reactor R by means of Figure 2 and Figure 2A. Figure 2 is an elevation of the apparatus, a part of the outer shell being cut away to show internal structure in cross section at a central vertical plane. Figure 2A is a plan view, one half of which is a cross section taken at plane BB' (indicated in Figure 2).

This embodiment of reactor R combines several functions and provides means to carry out the reaction of metal production, means to separate metal particles in two distinct size ranges and means to cool same, together with means to cool the product gases to such an extent that a substantial proportion of the condensible fraction is liquified and removed from R in liquid form. The elements for metal production, or the reactor proper are all found above horizontal plane AA'. The provisions for cooling the solid and gaseous products are arranged below plane AA'. All of the aforesaid elements are contained within the gas tight shell 1, which is preferably made of metal not affected by the temperature and other conditions imposed upon it. Shell 1 is provided with numerous openings which make gas tight connection with same.

The main volume of gas phase to be processed and which, in operation, flows continuously in pipe 2 of Figure 1 and under the control of valve 2A', enters reactor R through nozzle 2B which is preferably approximately tangential to shell 1. A second entry for gas phase 2D is provided, the rate of flow being controlled by valve 2C.

The main stream of reagent gas, entering through 2B, circulates around in the plenum chamber or volume between the outer wall refractory 1A, the refractory lined head of the vessel, the refractory floor 13 and the outer portions of the reaction chamber proper which is in cylindrical form and provided with a top closure refractory piece 16 making a gas tight joint with cylindrical wall 12, also preferably made of refractory ceramic material. Slot-like gas channels are provided in cylindrical wall 12, adapted to subdivide the gas flow into multiple streams and introduce same in substantially equal amounts at multiple points around the inner periphery of wall 12 of reaction chamber 6. In Fig. 2A the slots are shown between refractory partitions 4. The angle between the central vertical plane of each slot and the vertical diametrical plane of chamber 6 which intersects the first plane at the inner periphery of chamber 6 is of importance. Preferably said angle is between 96 and 105 degrees tho I may achieve vortex flow of the gas and some retention of solid particles in an outer zone of said vortex if I employ somewhat smaller or larger angles.

In order to maintain at least one electric arc near the periphery of chamber 6 I provide electrodes $4_1$ and $4_2$. In this embodiment of my invention these electrodes are in the form of plates and are substituted for the refractory partitions which would otherwise be employed at the selected positions. Said arc electrodes are each movable horizontally, the motion being guided by grooves formed in refractory 12 and 13 at top and bottom respectively. Flexible electric conductor G electrically bonds electrode $4_1$ to the metal shell 1, while allowing free horizontal movement of $4_1$ by means of rod 10, connected thereto. Rod 10 passes through shell 1 by way of a gas tight stuffing box 10A. Rod 9 passes through shell 1 via a gas tight stuffing box 9A. Electric insulator 8 is attached to rod 9 and to electrode $4_2$ which is thus moveable horizontally by means outside shell 1 while being electrically insulated therefrom. Flexible conductor L is electrically bonded to $4_2$ and to conductor 7 which passes through shell 1 via an electric insulator which makes a gas tight joint with the shell. Flexible conductor L is arranged to avoid restriction of horizontal movement of $4_2$. Once a suitable source of direct current is connected to the shell 1 of the vessel and to conductor 7 and an electric arc is initiated between the ends of electrodes $4_1$ and $4_2$ the arc will continue to play in a path near the inner circumference of chamber 6 providing rods 10 and rods 9 are mechanically adjusted from outside the chamber in order to compensate for the consumption of the electrodes by the arc action.

While I may operate my process using one arc only in reaction chamber 6 as shown in Figs. 2 and 2A I usually prefer to use multiple arcs equally spaced around the chamber in which case the arrangement of elements of each arc assembly can be a duplicate of that already described.

While I may use a variety of means to initiate one or more arcs, means involving an auxiliary grounded electrode and its temporary insertion and subsequent withdrawal from the reaction chamber are employed in this embodiment of my process.

Accordingly I provide electrode 22, preferably with a tungsten metal tip and a jacket of high temperature insulating ceramic covering same except at the tip. Electrode 22 is the right angle extension of electric conducting shaft 25 which passes thru the top head of the vessel via gas tight stuffing box 20 and thru a substantially gas tight stuffing box atop housing 23 which surmounts a metal plate, gas-tight cover for refractory 16. A radial slot 24 in refractory 16 provides for introduction of 22 into chamber 6 by downward thrust on shaft 25. When electrode 22 is thus positioned below plane BB' rotation of hand wheel 19 at the top of shaft 25 will carry the tip of electrode 22 around and near the inner periphery of chamber 6. Flexible conductor 17, electrically bonded to shell 1, and shaft 25, is arranged to make such rotation possible. To initiate the arc between electrodes $4_2$ and $4_1$ electrode 22 is positioned near the end of $4_2$ causing a temporary arc to spring between the tip of 22 and electrode $4_2$. Rotation of 25 counterclockwise lengthens the arc until, when the tip of 22 is well past grounded electrode $4_1$, the terminal of the arc automatically transfers itself from the tip of 22 to $4_1$. Having completed its function of arc initiation the auxiliary electrode 22 is rotated thru the remainder of the 360 degree circle, brought into registry with slot 24, and is then returned to housing 23 by pulling the shaft 25 upwards. A slight rotation of 25 after 22 is in housing 23 places 22 athwart the slot 24 where it remains until it is necessary to reinitiate the arc. Obviously if more than one arc is provided for in chamber 6 same may be initiated, in turn, as electrode 22 makes one complete revolution of the chamber.

To complete the description of mechanical features of my reactor, in its present embodiment, I mention the gas outlet pipe 3, centrally disposed and formed in refractory floor 13 and annular orifice 14. Orifice 14 is positioned to have a slightly smaller radius than the circular trace of the ends of the refractory partitions 4. Orifice 14 is in communication, throughout its circumferential length, with tank 15 which is otherwise gas and liquid tight. Accordingly the upward flow of reactant gas mixture fed into tank 15, via valve 2C, and pipe 2D in communication with tank 15 can be regulated to produce any desired upward velocity of gas phase thru orifice 14.

The flow of gas phase through the elements above plane AA' may first be described on the assumption that the electric arc (or arcs) is not in operation. The reactant gas in circulation in the aforementioned plenum chamber above floor 13 and outside of cylindrical wall 12 is forced thru the aforementioned peripheral slots which accelerate it to predetermined velocity in each of the multiple streams around the inner periphery of the slots. This velocity is preferably at least great enough to entrain particles of selected size range which are introduced thru pipe 11. The directional effect of the gas slots and the gas velocity achieved therein creates a rapidly whirling vortex flow of gas, spirally toward gas outlet 3. Solid particles introduced thru pipe 11 are entrained and forced into reactor volume 6 with the gas. Particles below a certain specific size range partake of the motion of the gas and describe a spiral pathway thru the chamber and immediately thereafter leave with the gas through pipe 3 despite the centrifugal forces which tend to throw them into a circular, rather than a spiral pathway. Particles above the aforesaid specific size range experience centrifugal forces great enough to make them circulate in a circular path about chamber 6 and in the near vicinity of the slotted inner wall thereof, that is, near the outer limits of the gas vortex formed in chamber 6. These circulating particles tend to sink to the floor 13 of the chamber under the substantially unopposed action of gravity. In operation of my process however I oppose this tendency by regulating the upward flow or gas phase through orifice 14. Thus particles of a certain selected size range take up a circular motion near the limiting wall of chamber 6 which motion is the equilibration of at least three forces, the viscous drag of the gas tending to impart a spiral motion to the particle and toward the gas outlet 3, the centrifugal force engendered thereby which converts the aforesaid motion to a circular pathway in a zone near the periphery of the chamber where the viscous drag of the jets of gas through the orifices balances the centrifugal force and thirdly, the viscous drag of gas thru annular orifice 14 which prevents particles of selected size range from passing downward to floor 13 and through orifice 14 under the action of gravity. The relative volume and velocity of gas passing upward through orifice 14 is preselected and regulated in reference to the total volume of gas flowing laterally in spiral motion to outlet 3 so that said gas from orifice 14 is whipped into the vortex motion and does not tend to throw the circulating particles against the upper wall of the chamber at least to any substantial extent.

While the form of my reaction chamber and mode of operation thus provides for the suspension of, and continuous rotation of particles in an outer zone of the gas vortex which is formed, providing said particles are of a selected intermediate size range, the force of gravity acting on particles of still larger size range will overcome the viscous drag lifting forces exerted by gas flowing upward through orifice 14 causing said particles to settle downward in their rotatory motion and ultimately to spiral downward to and through orifice 14 into tank 15.

In the operation of my process I may prefer to maintain a level of a selected liquid in the base of tank 15, said liquid having a specific gravity less than that of the particles which fall into tank 15. Accordingly particles falling through orifice 14 submerge themselves in the liquid. Annular tank 15 preferably is provided with vertical or steeply sloping sides and a sloping bottom contrived to cause all particles, irrespective of their point of entry into the tank 15, to collect at the lowest portion of said tank bottom. At this point I provide pipe 34 and, in the extension thereof outside vessel R, I provide valves 35 and 36 at a distance, one from the other, corresponding to a pipe volume greater than the bulk volume of the particles I wish to remove batchwise from my continuous process. In normal metal making operations I preferably leave valve 35 open to accumulate the solid particles from tank 15 in the space above the closed valve 36. At an appropriate time I close valve 35 and open valve 36 to discharge solid particles and ambient liquid without disturbing pressure and other conditions in vessel R. After said discharge of product particles I close valve 36 and preferably fill the volume between valve 36 and 35 with the liquid selected for use in tank 15 using obvious means not shown. Thereafter I open valve 35 for further accumulation of solid in the pipe volume between valves 35 and 36.

Having now described the mechanical functioning of my apparatus in respect to particles of different size which find themselves in chamber 6 the attributes of normal operation when the arc is being maintained will be readily understood. The arc has substantially no effect upon the mechanical motions of the particles which find themselves in chamber 6. Accordingly in normal opera- tions for metal production I preselect the size range of particles for introduction into chamber 6 via pipe 11 such that, under the velocity of gas flow which I intend to employ, very few, preferably none, of the particles will, after being introduced, spiral directly to and through exit orifice 3. Likewise very few, preferably none, of the particles are large enough to settle immediately and fall through orifice 14 into tank 15. A batch of this preselected size range of particles will describe a rotary path around the inside periphery of the chamber 6 indefinitely when the arc is not in operation. When the arc is in normal operation each particle tends to accrete metal from the gas phase thereby continuously growing larger until it ultimately settles down in its rotary motion and spirals through orifice 14 into tank 15. The sum of the incremental weights of the particles during their sojourn in chamber 6 represents a part of the total amount of metal made during the period of sojourn and all of the metal which is made in the form of larger particles. If adequately purified gas phase is supplied to chamber 6 the purity of the metal forming the larger particles is very high since said metal has been formed substantially without contact with any material other than the gas phase. Contacts of the particles with the side walls of the chamber, if any, are of fleeting duration and not of a character to allow of substantial absorption of impurity providing the refractory selected for forming the side walls is of suitable composition for its purpose.

In order to reduce the opportunity for picking up of impurities from the top and bottom walls (13 and 16) of the chamber 6 it may be advantageous in certain instances to provide for positive cooling thereof, as for example by fluid cooling coils in heat exchange relationship with said refractory. It is however usually possible to select refractories which do not require to be positively cooled in this fashion.

In what follows immediately hereafter I will more particularly describe what I am led to believe are the phenomena which take place when my process is in operation. The arc electrodes $4_1$ and $4_2$ are so positioned that the arc, and preferably a major portion of the length thereof, plays among the particles in suspension and in rotation in chamber 6. Each particle passes thru the arc plasma or sheath, or very near thereto, once in each revolution if there is one arc only in chamber 6. If I employ more than one arc disposed at intervals around the periphery of chamber 6 each particle passes thru, or near to, each arc in one revolution about the chamber. As a function of many variables, including the particle velocity and the power being expended in the arc, each particle is subjected to very rapid heating in going through or near an arc. After moving out of the arc zone the particle encounters relatively cool gas from adjacent slots, being cooled thereby, while at the same time the ambient gas momentarily enveloping the particle is heated.

In operating my process I prefer to proportion the reaction chamber 6 and the reagent gas flow so that, of the peripheral volume of the chamber in which solid particles are suspended, some 5 to 10% thereof is occupied by said particles. Relatively enormous surfaces of particles are accordingly presented to the arc for heating and subsequently to the colder gas from adjacent orifices for heating same (and cooling the particles). Under these circumstances and in consideration of the very large number of particles in circulation about the chamber one may describe the actions which occur in terms of an average particle. Such an average particle arrives at the arc locus at an elevated temperature $T_1$. In passage thru the arc it attains a temperature $T_2$. During its sojourn in parts of its circumferential path outside of the arc it cools back to temperature $T_1$. The heat energy given up by the particle heats the filament of the gas stream which it passed thru outside the arc from $T_3$ to a variable higher temperature averaging $T_4$.

When I properly adjust the energy expanded in the arc (or arcs if I choose to subdivide the total energy applied) and the frequency of the particle into and out of the arc zone in reference to the nature of the decomposable gas phase which I process, I can regulate temperatures $T_1$ and $T_2$ to be within the range at which ambient decomposable gas will indeed decompose, thereby precipitating metal on the particle surface. In this way the particle grows in size slightly with each projection from the vicinity of the arc into colder gas. When the particle is in the plasma, or probably also if it is in the sheath of the arc, the ambient gas is much higher in temperature than the particle, say at $T_5$. This very high temperature corresponds to a higher concentration of metal vapor in this locality than elsewhere in the apparatus, due to large, or perhaps complete, decomposition of the decomposable gas phase. The interposition of the colder surface of the metal particle provides a nucleus for metal condensation from this highly heated ambient gas, provided however that the condensation and other heating effects do not raise the surface temperature to a degree where the vapor pressure of the metal exceeds the partial pressure of the metal in the ambient gas. If this latter condition obtains the evaporation from the surface of the particle will exceed the simultaneous condensation thereon. Obviously conditions may be set up in which the loss of metal by vaporization in the arc zone will exceed the deposition of metal outside the arc zone and instead of the particles accreting metal in their rotation about the chamber 6 they will, under this condition grow smaller until finally they are swept in a spiral pathway to and through the outlet orifice 3 thereof.

When however I properly adjust the power input to my process in relation to the gas phase being processed I find that the particles of metal continuously grow in reaction chamber 6 until they attain a size range, predetermined in part by the velocity of gas flow through annular orifice 14, in which said gas flow is insufficient to retain the particle(s) in suspension and they fall through orifice 14 into tank 15.

Hereinbefore I have not distinguished between solid particles in circulation in chamber 6 and particles which may be at either temperature $T_2$ or $T_1$, in the molten state. I find that if a particle attains the melted state it does not behave substantially different from solid particles. Due probably to the relatively high gas velocity there is no noticeable tendency for the molten particles to agglomerate, or if this tendency exists and agglomeration does occur, it appears that surface tension forces are insufficient to cause agglomeration to a degree interfering with my operation.

In any case I prefer to provide a vapor space above the liquid level in tank 15 which is sufficient to chill and solidify, at least a surface skin, on each particle which may pass thru orifice 14 in molten form. The advantage is that when the very hot metal particle hits the liquid surface in tank 15 it is not distorted in shape but tends to sink thru the liquid in spherical or approximate spheroidal shape.

In operating my process I prefer to use, as the liquid in tank 15, the liquid metal salt compound which I charge to the process. I am however not restricted thereto but may use any liquid which, at the temperature I maintain in tank 15, is not unduly reactive with the solid metal I am producing, providing also that the vapors of such liquid when mixed with gas, as by orifice 14, do not exert uneconomic effects upon the course of the reactions occurring in chamber 6.

Preferably the liquid in tank 15 is kept boiling which ordinarily requires no positive means other than the substantially continuous introduction of hot metal and heat transfer from the surroundings. The vapor generated is mixed with the reactant gas entering pipe 2D and emerges into reaction chamber 6 through orifice 14. Under certain circumstances I may correspondingly reduce the volume of gas passing thru valve 2C or even completely close same depending upon the vapors from the liquid to supply all gas required through orifice 14.

One purpose of the liquid in tank 14 is to shield the metal which has been formed from further action at lower temperature, of the reactant gas or product gas. This is obviously most effectively achieved if the liquid in tank 15 is kept boiling. Whether said liquid boils or merely evaporates under the ambient pressure and temperature a liquid level is maintained in tank 15 by replacement of vaporization losses thru introduction of said liquid through pipe 33 under control of valve 145, which may if I desire be, in turn, under the action of a liquid level controller, not shown.

Returning now to a description of the behavior of the decomposable gas phase in reactor 6 it must be noted that said gas which has passed through ports not directing same through or near an arc is at the temperature imparted by transfer from particles which passed through it. It is only partly decomposed in the typical case corresponding to the amount of metal which has accreted to the particles which heat it. In contrast thereto the portion of the total gas which passed thru or near to an arc is much more largely, or even completely, decomposed corresponding to its high temperature. Moreover it tends to carry precipitated solid (or liquid) metal in suspension, the subdivision of which is sufficiently fine that said discrete particles are not retained in the zone of the arc by centrifugal forces. Among these particles of metal are those which, tho formed in the arc zone and in the midst of the larger circulating metal particles, were, through the operation of the laws of chance, not caught up with or on the surfaces of the larger particles. Agglomeration of these new nuclei to larger particles account for their presence in the hotter gas striae spiraling toward and through outlet 3. The mixing of the gases in and about outlet 3 tends to equalize the temperature and to precipitate more finely divided metal. This newly formed metal of large surface area tends, in the typical case, to be very reactive to the other product components in the gas phase and, in the typical case, will revert to gaseous substance if the metal particles are not separated prior to cooling the mixture to normal temperature or thereabouts.

In order to recover the metal which is formed, as such, I make use of the rapid whirling motion of the two phase suspension. When the suspension flows down pipe 3, of substantially smaller diameter than chamber 6, its angular speed of rotation is substantially increased. Fine particles not retained by the centrifugal forces in chamber 6 are thrown to the inner wall of pipe 3 and rapidly rotate about the axis of the pipe as a center while moving forward parallel to said axis. When said particles encounter annular orifice 37, preferably positioned not far below the plane AA' they are thrown into tank 43 in communication with said orifice. The tendency of the gas to enter tank 43 is blocked by the fact there is no gas outlet from said tank.

I preferably maintain a liquid level in tank 43 substantially below orifice 37 by regulation of liquid flow into tank 43 through pipe 39 by means of valve 144. The tank preferably is provided with steeply sloping side walls and a sloping bottom adapted to accumulate particles, which enter at any point around the periphery and sink through the liquid, at one lowest point, 40.

As the particles submerge themselves in the liquid and are cooled thereby they vaporize liquid and the vapors streaming outward through orifice 37 constitute a further very effective means to prevent ingress of product gas phase into tank 43. I prefer, when operating my process, to keep the liquid in tank 43 at the boiling point, a condition usually automatically maintained by the hot particles entering tank 43, and by radiation effects. I may provide suitable closed heating coils submerged in tank 43, or other heat, but not material, exchange means to maintain boiling liquid in tank 43 but said additional means are not typically necessary and are not shown in Figure 2.

At the lowest point 40 of tank 43 I provide, preferably, an outlet pipe for solid particles communicating with the outside of vessel 1 and valves 41 and 42, the entire arrangement being substantially similar, in form and function, to pipe 34 and valves 35 and 36 provided for tank 15. Using valves 41 and 42 I withdraw metal product particles at intervals from tank 43 together with an aliquot proportion of the liquid used in tank 43.

In the usual case I prefer to utilize the same liquid for tank 43 which I employ in tank 15 which procedure is indicated in the common liquid circulation line 142 of Fig. 1. I may however, employ a different liquid if I choose in which case I provide a separate system consisting basically of a supply or storage tank, a suitable pump and piping to convey the selected liquid from the source supply into tank 43 at a regulated rate.

The hot product gas from my process, substantially free of metal particles due to the action of orifice 37, enters pipe 5, the extension of pipe 3, and may be cooled by any appropriate means. One means, often preferable, is to position a selected part of the coils 104 for vaporizing feed to my process in heat, but not material, exchange relationship the hot gas product whereby a preselected and substantial part, or all, of the feed to my process may be vaporized by heat exchange from the product gases. Alternatively or in conjunction therewith I may place pipe coils in pipe 5 for circulation of water in heat, but not material, exchange with the gaseous products of my process and the production of steam according to well known methods adapted thereto.

For the benefit of simplicity in Fig. 2 I have not indicated the pipe coils to be used for either of the alternate methods of heat recovery mentioned in the next previous paragraph but it will be understood by those acquainted with the art that I usually prefer to position said coils, if any, in the gas product flow in pipe 5 upstream from the location of spray nozzles 44B and downstream from the position of orifice 37.

The function of spray nozzles 44B in pipe 5, which nozzles are in communication with liquid supply tank 44 is to introduce relatively copious amounts of said liquid into the product gas to reduce its temperature to, preferably, somewhat below the boiling point of the cooling liquid under the ambient pressure. Accordingly tank 44 (and spray nozzles 44B) are supplied via pipe 44A under regulation of valve 143 with suitable liquid at a temperature substantially below its boiling point. I often prefer to utilize as cooling liquid for tank 44 the same liquid which I utilize as feed stock to my metal producing process but I may employ any other liquid which does not react unfavorably with the product gases of my process. Figure 1 shows line 142 conveying the feed liquid to valve 143 in an arrangement adapted to this embodiment of my process. If I use other than feed liquid for tank 44 I provide a separate supply system for said other liquid as will readily be understood by those acquainted in the art.

I usually find it advantageous to supply sufficient liquid thru the spray nozzles to supersaturate the gas passing down pipe 5 and thus maintain a liquid level M in the base of vessel 1 which submerges the bottom end of pipe 5 forming a liquid seal. The control of said liquid level is maintained by appropriate adjustment of the rate of pumping liquid out of the vessel by pump 136 of Figure 1. Uncondensed gas which passes out of the lower end of pipe 5 bubbles up through the aforesaid liquid and leaves the base of vessel 1 thru nozzle 45 from whence it is treated in part as already described in connection with Figure 1.

Having now completed the description of one embodiment of my process it will readily be understood that almost every feature of said embodiment may take alternative forms without departing from the teaching herein as to a new and novel method of forming metals from vaporizable and decomposable salts thereof.

With particular reference to reaction chamber 6 and immediate auxiliaries it may be mentioned that I have found it advantageous to provide the arc electrodes in the form of disks which are mechanically driven to continuously present "new spots" on the periphery as the terminal for the arc. Said disk electrodes may be contrived to act as directing vanes for the gas similar to the directive effect of the plate electrodes $4_1$ and $4_2$ of Fig. 2A. While I may use tungsten metal for my electrodes, either in the general form of embodiment shown in Figs. 2 and 2A or in disk form I usually prefer to fashion my electrodes from the metal which I intend to produce in my process. In this case it is particularly advantageous to employ rotating disk electrodes because the consumption of electrode material is less when the "hot spot," characteristic of either terminal of an arc, moves over a surface rather than remaining substantially stationary thereon. I may, of course, choose other materials than tungsten or the metal I intend to produce, for my electrodes, such as for example, carbon, but this and other electrode materials often are unsatisfactory on account of contamination of the metal I produce. It is further obvious that I may achieve my purpose of causing one or more arcs to play among particles of solid (or molten liquid) near the periphery of the gas vortex set up in my apparatus by other arrangements of the two electrodes for each arc. I may for example position one electrode to project through the top of my reaction chamber and the other electrode of each arc may be prearranged to take any one of several positions near the bottom periphery of my reaction chamber.

The form and proportions of my reaction chamber may be varied from that shown in Figs. 2 and 2A and I may use a centrally disposed outlet for gas at the top rather than at the bottom of my reaction chamber. If I choose I may employ both bottom and top gas outlets for said chamber.

While the various forms which the reaction chamber may take and still carry out my process makes it impossible to prescribe the velocity of the gas through the gas slots which will satisfactorily create a solids-retaining gas vortex in the general case, and the velocity limits are also dependent upon the size and specific gravity of the solids introduced, in relationship to the density of the gas phase, the proper condition may readily be determined by experiment with a specific design of gas chamber. A rule of thumb which has proved helpful as a point of departure for orientation designs and subsequent experiments may be cited as follows. With a reaction chamber in the size range of from 6 to 10 inches in diameter, using particles in the density range of from 1.6–3.0 and size range 0.01 to 0.02 inch equivalent diameter a gas, having a density of 1.0 under the conditions at the peripheral gas slots, will produce a solid suspending and rotating gas vortex if given a slot velocity in the range of from 5 to 25 ft. per second in an embodiment of my apparatus similar to that shown in Figs. 2 and 2A. Application of the known laws of centrifugal forces, viscous drag of gases in particles, the effect of density differences between solid and gas on the relative motions thereof etc. will be helpful in translating experiments with a system as nearly like that intended for metals production as it is possible to contrive with a specific design, such preliminary experimentation being essential to establishing optimum conditions for the practice of my process.

While I usually find it advantageous to operate my process of metals production under conditions such that the gaseous product phase leaves the reaction chamber at a pressure slightly greater than atmospheric pressure and so that the feed gas phase is correspondingly only fractions of an atmosphere higher in pressure, I am not limited to operation in this pressure range. By applying suitable pressure reducing means, such as a vacuum pump to pipe 132 of Fig. 1 I can operate at regulated pressures in and about the reaction chamber which are substantially less than atmospheric pressure, the lower limit being set in any particular system by the requirement that the mass rate of flow of gas phase through my reaction chamber shall be sufficient to cause segregation and suspension of particles in the outer zone of the gas vortex formed in said reaction chamber, and further providing that the characteristic temperature of the arc which I employ remains high enough at the selected pressure to effect the decomposition of the selected feed gas to my process. It is equally obvious that I may operate my process at pressures substantially in excess of atmospheric pressure, if I choose, and that to do so merely requires the application of suitable known pressure regulating means on the stream of gas subsequent to gas outlet 45 of Fig. 1. I usually find it advantageous to apply these pressure regulating means to exit gas pipe 132.

One variation of my process which I may employ, if I choose, involves elimination of liquid phase for rapid reduction of the temperature of the solid metal produced. In this variation I provide the equivalent of tanks 15 and 43 in the form of refractory lined chambers adapted to receiving and holding the respective hot metal particles produced in my process without the presence of liquid phase. To effect at least some cooling of the particles I preferably provide cooling jackets for said tanks adapted to this purpose when supplied with a flowing stream of lower temperature fluid. In this modification of my process I eliminate pipe 33 in communication with tank 15 and substitute for the flow of liquid through pipe 39, communicating with tank 43, a flow of gas phase preferably feed gas to my process such as is supplied through pipe 2D to tank 15. By this procedure, and the resulting positive flow of added gas inward through orifice 37 I am able to prevent or at least largely eliminate the contact of product gas with the hot metal contained in the equivalent of tank 43. In this modification of my process I preferably withdraw hot metal particles from equivalents of tanks 15 and 43 through suitable equivalents of valve pairs 35 and 36, and 41 and 42 respectively and thereafter cool said products by known means exterior to the elements shown in Fig. 2.

In the event I prefer not to employ liquid for cooling purposes in the equivalents of tanks 15 and 37, or even in certain cases when I do so, I may prefer to eliminate the spray contact cooling described in connection with gas pipe 5, spray nozzles 44B etc. In this event the heat exchange surfaces of cooler 129 of Fig. 1 are made large enough to accomplish all cooling desired and the precipitation of the major portion of unreacted feed stock which may be present in the product gas.

A somewhat different embodiment of my metals producing process enables me to utilize decomposable gas phases including metal salts which, on heating, do not pass through the molten liquid stage but change directly from the solid to the gaseous phase. An example of this behavior is encountered when I apply my process to the manufacture of metallic zirconium using zirconium tetrahalide salts such as the chloride, bromide or iodide together with hydrogen as feed stock to my process.

Figure 1A:
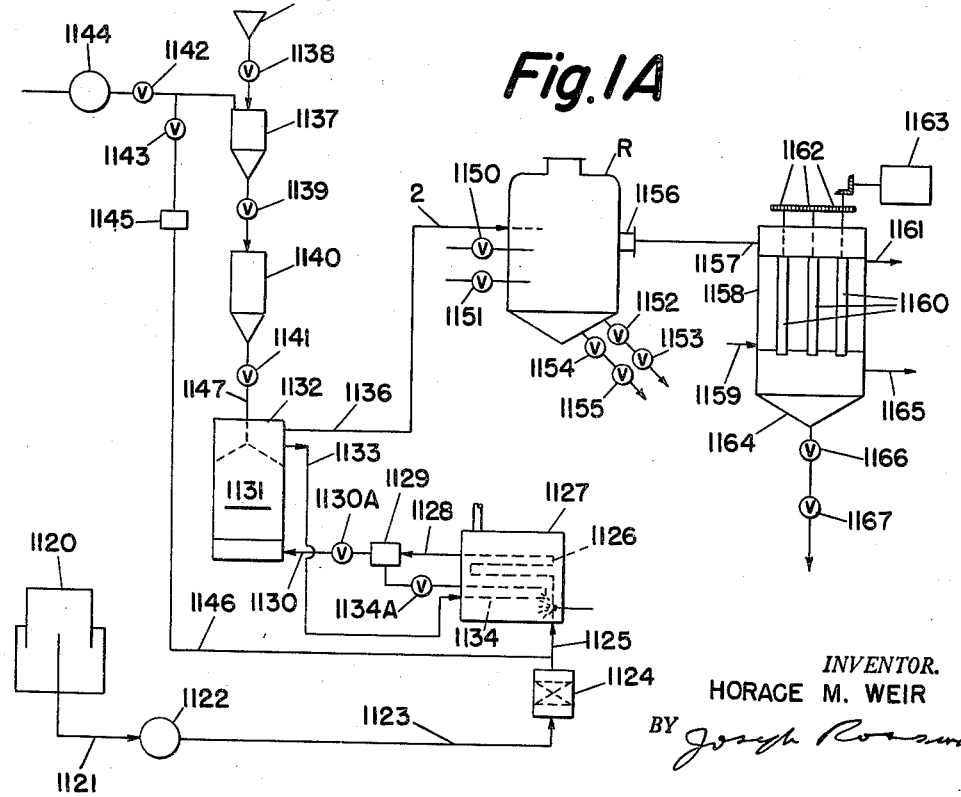

Fig. 1A illustrates diagrammatically the means I prefer to employ in this and similar cases when preparing the vaporized feed stock for my reactor.

In Fig. 1A 1120 is a storage gas holder for purified hydrogen which is removed therefrom through pipe 1121 by compressor 1122 which compresses same to a regulated pressure which may be 50 pounds per square inch absolute or thereabouts. The compressed gas is forced through pipe 1123 and through a suitable dryer for removal of moisture, 1124. This dryer may contain a bed of solid dehydrating agent such as silica gel or activated alumina. The dry hydrogen is then forced through pipe 1125 and through heating pipes 1126 situated in a fuel fired heater 1127 adapted to raise the temperature of the gas at its outlet, preferably to about 700° C. after which it flows through pipe 1128 and through an eductor 1129 which reduces its pressure substantially. The eductor serves functions to be described later and causes additional hydrogen to mix with the stream under consideration. The mixture then flows through pipe 1130 into chamber 1131 containing a bed of metal halide salt in appropriate granular subdivision. The stream of gas passing upwards vaporizes a portion of the granules being thereby cooled and being partly saturated at the reduced temperature at which it emerges into vapor space 1132 above the halide bed 1131. Pipe 1133 communicating with the vapor space 1132 is provided to withdraw a portion of the gaseous phase which then flows through pipes 1134 also situated in heater 1127 in a prefered embodiment of my process. Eductor 1129 provides the motive force for this circulating gas flow and the gases heated in pipes 1134 flow into the eductor and are mixed with the hot hydrogen from pipe 1128. It will be understood by those acquainted with the art that the benefit which I obtain from the aforesaid circulation is that I am thereby enabled to introduce the necessary heat of sublimation of the metal halide salt using a lower temperature of hydrogen at the outlet of pipes 1126. Accordingly by regulating the pressure at the outlet of compressor 1122, and gas throttling valves 1130A and 1134A, together with the outlet temperature of both the hydrogen flowing through pipe 1126 and the mixture flowing through pipes 1134 I am able indirectly to control the proportion of hydrogen and salt vapor in admixture at the top of vessel 1131. The vapor phase mixture leaves 1131 through pipe 1136 which is connected into, and becomes pipe 2 of Figure 1.

In order to replace the solid metal halide which is vaporized from the halide bed in vessel 1131 without disturbing the continuous operation of vaporization I employ a system of interlocked vessels for gravity introduction of the solid granules at the top of chamber 1131.

In the operation of my process in this modification thereof I charge the halide salt selected for treatment in a batchwise procedure, as follows. With valves 1139, 1142, and 1143 closed and 1138 open I charge vessel 1137 with solid halide by appropriate known means using the hopper 1138A as the entry port. After closing valve 1138 I open valve 1142 and operate compressor 1144 to exhaust substantially all air from the vessel and from the surface of the solid. I then close valve 1142 and open valve 1143 to cause hydrogen to flow through pipe 1146, in communication with the outlet from compressor 1122, and through pressure reducer 1145, preferably adjusted to reduce the pressure to substantially that obtaining in the top vapor space of vessel 1131, and into vessel 1137. I may, if I choose, reexhaust the gas from vessel 1137 after an appropriate interval by closing valve 1143 and opening valve 1142. This procedure of filling and exhausting the vessel 1137 may be repeated as often as required in order to thoroughly purge the vessel 1137 and solid contents of all air and moisture. This operation completed, and with the vessel 1137 filled with hydrogen at a pressure substantially the same as that above the solids bed in vessel 1131 I close valve 1143 (valves 1142 and 1138 being already closed) and open valve 1139 discharging the solids by gravity into vessel 1140 against the action of closed valve 1141. After I close valve 1139 vessel 1137 is in condition to receive additional solids charge material and to undergo the cycle already described. With valve 1139 closed I open valve 1141 releasing the solid particles for gravity flow downward through pipe 1147. The more or less conical pile of solids which accumulates below the end of pipe 1147 and which gradually recedes downward as solid is vaporized from the bed in vessel 1131 serves as an automatic regulation of solids flow from vessel 1140 into vessel 1131. When the contents of vessel 1140 are lowered below the position of valve 1141 I close same and open valve 1139 for refilling with solids from 1137. It will be understood that I proportion the sizes of vessels 1137, 1140 and the rate of vaporization of solid from vessel 1131 so that fresh degassed charge particles are always available in vessel 1137 before it is necessary to refill vessel 1140 as just described.

By the procedure just described or obvious modifications thereof I am able to provide a continuous flow of feed stock mixture comprised of reducing agent hydrogen and metal salt vapor to my reactor R, said mixture being in predetermined ratio, even tho the metal halide salt which I select for processing does not show a liquid phase when the temperature is raised under the pressure which I independently select for carrying out my metal producing operation.

Continuing with the description of this embodiment of my process by reference to Figure 1A, R is my reactor with feed vapor inlet 2. The internal arrangement of reactor R may be similar to that described in detail in connection with Figs. 2 and 2A it being understood however that I usually prefer, when using this embodiment of my process to dispense with liquid cooling of both fractions of solid metal particles and the product gas phase. In accordance with this preference the counterparts of tank 15 and tank 37 in Fig. 2 are refractory lined vessels provided with pipes and valves 1150 and 1151 respectively for introducing feed gas mixture to gas tanks are hereinbefore described. The outlet pipes and valves pairs, 1152 and 1153, also 1154 and 1155 serve to remove the solid particles produced in my process without interrupting the continuity thereof.

For cooling the product gases which emerge from reactor R through pipe 1156 I may employ heat exchange methods which are well known in principle, it being important, if I use tubular exchangers, that the walls thereof in contact with product gas be continuously maintained at temperature above the temperature at which solid unreacted halide begins to condense as a solid from the gas phase. In Figure 1A I do not show heat exchange surfaces for recovery of heat from the gases, which would preferably be positioned in the gas flow between reactor outlet 1156 and cooler inlet 1157, but show gas product being cooled without heat recovery in cooler 1158. This cooler provides for heat, but not material, exchange between water, preferably circulated from water inlet 1159 around the outside of multiple tubes 1160 and to water outlet 1161, and the product gas phase which passes downward inside said tubes. I preferably provide each tube with a scraping mechanism adapted to remove the solid condensed on the inside wall of the tube, the drive shaft and connected drive gears for said scrapers, being indicated by 1162. Electric motor 1163 is suitably geared to continuously rotate said scrapers.

The solid removed from the tube walls by the multiple scrapers falls into gas and solid separator 1164 from which the gas, cooled to a temperature corresponding to substantially complete removal of metal halide salt, emerges through pipe 1165. The solid which collects in the base of 1164 is removed at intervals through the double valve arangement indicated by valves 1166 and 1167. The mode of removal of solid together with relatively unimportant amounts of product gas is analogous to that described hereinbefore. Since the solid phase removed from cooler 1164 is typically of substantially the same composition as the solid feed to vessel 1137 I usually find it advantageous to return same to said vessel 1137 for reevaporation and introduction in my process. Unreacted hydrogen and hydrogen halide which constitute the major proportion of the gas leaving my process through pipe 1165 may be suitably separated after which the hydrogen may be returned to gas holder 1120 for reuse in my process. By suitable chemical transformations and treatment the hydrogen halide gas may be utilized to make additional metal halide salt for production of metal in my process.

Having now described my process of metals production as employed to treat liquid or solid metal halides and prepare a gas phase therefrom which is capable of decomposition in my new and novel means of providing for said decomposition and precipitation of metal it will be obvious that my process can be applied to produce a number of different metals. In general it is possible to produce metal from substantially all gas phases which are adapted to the production of metal by precipitation on a hot wire. This method is well known in the art but is limited in commercial application because it cannot be applied continuously and the surface available for metals precipitation is relatively small. Moreover the fact that the heating current and power must be continuously changed as metal precipitates on the hot wire and that the temperature which may be employed must be substantially less than the melting point of the metal being precipitated constitute serious limitations to its commercial application. The chief advantage of the hot wire process is its adaptability to the production of metal of high purity from gas phases of high purity since there need be no contact of precipitated metal with alloying impurities.

From the hereinbefore description it will be obvious that my process incorporates the advantage of precipitation of metal without substantial contact with other than the gas phase, in respect, at least, to that fraction of the total metal production which is accreted on particles of said metal in suspension and rotation about the periphery of my reaction chamber, and furthermore my process provides the following distinct improvements over prior processes for production of pure metals from decomposable gas phases, namely (a) It is adapted to continuous operation.
(b) The temperature for metal precipitation can be adjusted to exceed the melting point of said metal if desired.
(c) The power input is substantially constant as are both of the two factor voltage and current, circumstances which combine to increase efficiency and decrease investment per unit of metal produced.
(d) The surface of metal for precipitation of metal from the gas phase is characteristically many times the surface which it is possible to provide in prior process and the power input is adjustably independent of said large surface, both of which factors can be adjusted to provide for high rates of metal production per unit volume of reactor.
(e) The intermittent heating and cooling of metal surface, upon which precipitation occurs from the gas phase, and the rapidity of the aforesaid intermittent effect, particularly when the power adjustment produces a maximum temperature in the cycle which is near to, or even above, the melting point of precipitated metal provides a compacting effect on the metal particles which are produced, tending to avoid production of powdery or dendritic metal.
(f) The metal which is produced is in particle form, a fact which, while it may increase the need for means to protect the product metal from unwanted reaction with ambient gas phase also provides for simpler application of said means and for the transport of product metal to further processing operations. The subsequent transport of product metal to means for forming into billets may, for example, be conducted in pipes by known means, including the provision of ambient atmospheres of inert gas.
(g) Despite the effective means provided to reduce the sorption of hydrogen by metal the ductility of such gas sensitive metals as titanium and zirconium can usually be increased by desorption of traces of hydrogen under high vacuum. The particle form of the product metal greatly facilitates such a desorption step.
(h) The ease of transport of the product metal and its approximately equal sized subdivision greatly facilitates its subsequent forming into billets or directly into sheets by means which will subsequently be disclosed.

While I have described my process in the embodiment represented by Figure 1 and Figures 2 and 2A by citing titanium tetrachloride as raw material, and while I have described Figure 1A by citing one of the zirconium halide salts (other than fluoride) as raw material, it will be obvious to those acquainted with the art that my process can readily be adapted to the production of certain other metals and elements with somewhat related properties.

The general reaction which at least makes understandable the basis of production of an element from a heat decomposable halide compound thereof, is given as Equation 1, which may, of course, not indicate the actual mechanism of the reaction.

$$MY_n \rightarrow M + \frac{n}{2}Y_2 \qquad (1)$$

where
M = the element which may be a metal or boron or silicon.
Y = halogen, other than fluorine.
n = a number, usually 4.

If the decomposition of halide salt according to Equation 1 is insufficient at easily attainable temperature or even in cases where it is, it may be advantageous to employ hydrogen as a reducing agent. In this case the reaction which occurs may be symbolized by $$MY_n + \frac{n}{2}H_2 \rightarrow M + nHY \qquad (2)$$

An essential requirement for application of my process is that the halogen salt which I employ must be substantially stable at its temperature of vaporization under the conditions imposed and that it shall become unstable in the sense of the equations at substantially higher temperature. A third requirement is that the vapor pressure of the pure element must be relatively very low at the temperature of substantial decomposition of its salt. Reaction 1 is definitely reversible—the products shown on the right hand of the equation tending to recombine to form salt if the temperature of the system is lowered. This necessitates the removal of the products, one from the other before a cooling step, the specific means for removal having been already described herein for the embodiments of my process indicated in Figs. 2 and 2A.

The tetrahalide salts of certain elements meet the requirements of stability at the temperature of substantial vaporization pressures and instability at higher temperatures readily attainable in my process. The laboratory method of producing certain metals such as titanium, zirconium, and hafnium by means of a hot wire is commonly carried out using the tetraiodide salts of these metals, formed in situ, as the vapor phase. While in my commercial and continuous process for metals production I may employ the tetraiodide salts I usually prefer to use the tetrachlorides, on account of their relatively lower cost and availability. The chlorides are more stable at high temperatures however and it is advantageous and practically essential to employ a reducing agent (hydrogen) according to Reaction 2 aforesaid when I employ titanium tetrachloride or zirconium or hafnium tetrachloride to make the corresponding metals.

In order to indicate the scope of application of my process means and the system which may be employed to make individual elements thereby I append Table 1, without intending to limit the scope of application by the scope of this table. In the second column of the table I indicate the preferred method of operation by reference to Fig. 1 or Fig. 1A. The first three entries in the table refer to applications of the process using thermal means only to effect decomposition, as epitomized by Reaction 1 hereinabove. The remaining entries involve reductions with hydrogen present in the gas phase and are specific applications of Equation 2. The particular equation which appears to apply in each case is given in the Table 1 under the caption, "Reaction."

*Table 1*

| Metal Produced | Method | Reaction | Temperature Range, Deg. Centigrade |
|---|---|---|---|
| Titanium | 1 | $TiI_4 \rightarrow Ti + 2I_2$ | 1,200–2,500. |
| Zirconium | 1A | $ZrI_4 \rightarrow Zr + 2I_2$ | 1,300 upwards. |
| Tungsten | 1 | $WCl_6 \rightarrow W + 3Cl_2$ | 1,500 upwards. |
| Titanium | 1 | $TiCl_4 + 2H_2 \rightarrow Ti + 4HCl$ | 1,100 upwards. |
| Zirconium | 1A | $ZrCl_4 + 2H_2 \rightarrow Zr + 4HCl$ | 1,200 upwards. |
| Tungsten | 1 | $WCl_6 + 3H_2 \rightarrow W + 6HCl$ | 1,200 upwards. |
| Boron | 1 | $2BCl_3 + 3H_2 \rightarrow 2B + 6HCl$ | 600 upwards. |
| Silicon | 1 | $SiCl_4 + 2H_2 \rightarrow Si + 4HCl$ | 1,100 upwards. |
| Silicon | 1 | $SiHCl_3 + H_2 \rightarrow Si + 3HCl$ | 1,000 upwards. |

The last column of Table 1 is intended only to be qualitatively indicative. This is necessarily so on account of: (1) continual and rapid variation of the temperature of each particle in its rotation about the reaction chamber and in and out of the arc and the substantial impossibility of direct measurement of said temperature range as referred to the average particle; (2) the effect of variations in the proportions of hydrogen and metal halide on the optimum temperature for metal production.

I usually find it advantageous to operate the reduction process for a given metal production using from 2 to 20 times the weight parts of hydrogen indicated as necessary to complete the reaction according to the reaction given in Table 1.

When I operate my process for the production of substantially pure metal it is essential to exclude from the reacting system to as great a degree as possible all free oxygen, nitrogen, sulfur, and carbon and compounds thereof, which tend to be unstable under the conditions which I use in the reacting system. To obtain metal of highest purity it is essential that the halide employed as raw material be highly purified and that the hydrogen which I employ in the reduction process be likewise of highest purity particularly in respect to oxygen, nitrogen, and carbonaceous volatile compounds.

Process means have been described in connection with Figures 1 and 1A to insure the removal of water from the reagents continuously fed to the process. When first starting operations or after an interruption it is essential to reduce the water vapor in the apparatus or occluded on the walls thereof to a minimum before actual element making operations are started. To effect this removal of water I usually find it advantageous to pass dry hydrogen through the sequence of apparatus, heating the stream by the means provided for normal operations when the metal salt is being processed. Depending on circumstances it may be advisable to pass hot hydrogen for a matter of several hours in order to remove all water, after which normal procedure including the admixing of halide may be commenced.

In selecting the refractories to be used in reactor R, I prefer to use materials which exert an extremely small equilibrium pressure of oxygen at high temperatures, thorium oxide base refractories and zirconium oxide refractories being notable in this respect. Other refractories may be useable, and advantageously used particularly in the cooler parts of the reactor and accessories.

It is obvious that I am not limited to the manufacture of pure metals by my process but may if I choose manufacture alloys therewith by either one of two procedures: (1) the utilization of a mixture of two or more halides in the gaseous phase together with the addition of mixed metal, or alloy, particles; (2) the addition of particles substantially composed of one selected metal, $M_1$, and using a gas phase substantially composed of another metal halide, $M_2(halogen)_n$. The fact that my process is capable of treating metals at temperatures above their melting points—and without substantial contact with other than a gas phase—greatly facilitates the manufacture of alloys. The high temperature employed and the large surfaces facilitate the diffusion of metals into each other and the formation of particles of substantially uniform composition even in cases where melting is not involved. The principal limitation appears to be the obvious one, viz. the vapor pressure of the solid (or molten) phase introduced or produced in the operation must be relatively low at the temperature where substantial decomposition of the selected vapor phase occurs.

Another application of my process is in the manufacture of carbides of metals readily forming same at high temperatures, such as for example titanium, tungsten and zirconium. It has already been emphasized that when I purpose to produce pure metals it is important to exclude from the reaction zone substantially all decomposable carbon compounds. When I wish to produce carbides instead of pure metals I preferably add to the gas phase prior to charging same to my reactor, a selected hydrocarbon, substantially free of oxygen or nitrogen. While the hydrocarbon selected may belong to the paraffinic, olefinic or aromatic groups of hydrocarbons I usually prefer to employ the paraffinic hydrocarbons and particularly methane or natural gas when this is available. I may however use ethane or propane or butane. All of these compounds tend to precipitate free carbon in the reaction zone and on the walls of same, the tendency being the greater with the higher molecular weight hydrocarbons. This tendency can be markedly reduced by employing free hydrogen in the gas mixture used in my process and I ordinarily manufacture carbides using hydrogen substantially in excess of that theoretically required to effect the reduction of the halide salt to pure metal according to Reaction 2 mixed with hydrocarbon gas in an amount corresponding to substantial excess of carbon over the requirement for completely converting the reduced metal to metal carbide. Thus if I purpose to make titanium carbide I may advantageously charge to my reaction chamber a gaseous mixture composed of about one volume part of titanium tetrachloride, three volume parts of hydrogen and two volume parts of methane, suspending therein particles which preferably contain substantial amounts of titanium carbide. The latter may be advantageously obtained from previous operation of my carbide producing operation or may result from entirely different carbide making operations.

It is apparent that many other modifications of my process for the production of pure metals or of alloys or of carbides can be made without departing from the broader scope of the invention. It is not intended that the invention be limited by the specific embodiment shown, nor examples given, nor by theories suggested as to the mechanism by which my process becomes operative.

Wherever in the claims I use the word "particles," without mentioning the phase in which they exist, I refer to subdivisions of matter composed of either solid and liquid phases together, or composed wholly of solid or of liquid phase.

I claim:

1. The process of continuously passing a suspension of discrete solid particles suspended in a decomposable gas phase through an electric arc at velocities to heat the discrete particles and decomposable gas phase differentially and deposit on the solid particles a non-gaseous decomposition product of the gas phase.

2. The process of decomposing a decomposable gas in the presence of discrete particles which accrete at least a portion of at least one decomposition product which comprises the steps of forming a suspension of said particles in said gas, passing a portion of said suspension through an electric arc to heat the two phases differentially, forcing a substantial proportion of the heated particles into the flowing gas which has by-passed the arc to heat and at least partially decompose same on the surfaces of the particles.

3. The process of cyclically heating and cooling particles of matter suspended discretely in a decomposable gas phase to accrete a non-gaseous decomposition product on said particles which comprises the steps of forming a suspension of said particles in a flowing stream of said gas, directing a portion of the stream through an electric arc, forcing at least a portion of the particles heated by the arc to circulate from the arc zone through cooler gas which has by-passed the arc and back to the zone of the arc without substantial recirculation of gas phase.

4. The process of claim 3 with additional steps, comprising commingling the fraction of the gas stream which has passed through the arc with the fraction which has by-passed same to produce additional decomposition including precipitation of non-gaseous components, separating the two phases without substantial cooling and subsequently cooling both of the separated phases.

5. The process of accreting at least one of the decomposition products of a decomposable gas phase on the surfaces of discrete particles suspended therein which comprises the steps of passing the gas phase into a gas confining chamber, continuously and at a regulated rate, adding particles of predetermined size range at a regulated rate to suspend said particles in said gas, maintaining an electric arc, imparting different velocities to the two phases to force a substantial fraction of the total number of particles to repeatedly traverse at least part of the locus of said electric arc and maintaining said arc by continuous power expenditure to establish a cyclic change of temperature of said particles including temperatures above that of substantial decomposition of the gas phase and removing the product gas phase and the particles from the chamber.

6. The process of producing a metal by the action of an electric arc on a mixture of vapors of a hydrogen reducible chemical compound of said metal and hydrogen which comprises the steps of continuously forming a gas phase containing the reducible metal compound and hydrogen, continuously feeding the mixture into a gas confining chamber to produce vortical flow and maintaining a vortex, introducing solid particles of predetermined size range at a regulated rate into said vortex whereby a substantial fraction of said particles are centrifugated and thereby caused to congregate discretely and circulate in suspension about the axis of the vortex in an outer zone thereof, maintaining a substantial part of at least one electric arc in said outer zone of said vortex to heat the particles and accrete metal formed from the gas phase on the surface of said particles and selectively removing the incremented particles from the zone of circulation.

7. The process of decomposing a metal halide in the presence of extended discontinuous hot surfaces of said metal which comprises the steps of continuously forming a gas phase containing said halide, suspending discrete particles of said metal in the continuously flowing gas phase in regulated weight ratio, maintaining an electric arc in the path of flow of the suspension and continuously supplying electric energy to said arc to heat at least substantial fractions of both the discontinuous solid particles and the continuous gas phase above the temperature of substantial decomposition of the gas phase, adjusting the velocity of particle transit thru the arc to avoid heating thereof to temperatures at which the metal exerts a substantial vapor pressure and separating the two phases prior to substantial removal of heat therefrom.

8. The process of claim 7 in which hydrogen is commingled in regulated proportion with the gas phase before the suspension is passed thru the zone of the arc.

9. The process of claim 7 in which the metal halide which is treated is selected from the group which consists of boron trichloride, silicon tetrachloride, silicochloroform, titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, tungsten hexachloride and the solid particles which are suspended are substantially composed of the element corresponding to the halide which is selected for treatment.

10. The process of claim 2 in which the decomposable gas is substantially composed of titanium tetrachloride and hydrogen and the discrete particles are substantially composed of metallic titanium.

11. The process of claim 6 in which the electrodes of the arc are substantially composed of the metal which is accreted on the surface of said particles.

12. The process of claim 1 in which the decomposable gas phase contains a halide compound selected from the group which consists of boron trichloride, silicon tetrachloride, titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, tungsten hexachloride, and the discrete particles are substantially composed of element which is combined with the halogen in the selected halide.

13. The process of effecting decomposition of a decomposable gas phase into a solid and another gas which comprises forming said decomposable gas phase continuously, suspending solid particles of matter of selected size range in said gaseous phase, maintaining an electric arc and passing only a part of the suspension through the electric arc while the remainder by-passes said arc, channeling the two phases to force the particles to recirculate through the zone of the arc repeatedly without substantial recirculation of gas phase, regulating the energy input to the arc to maintain cyclic heating of the particles to temperatures above that of substantial decomposition of the decomposable gas phase and below the temperature at which the particles exert substantial vapor pressure, whereby non-gaseous decomposition products accrete on the particles from the gas phase, selectively removing the particles from circulation when same attain predetermined size by regulating the velocity of gas phase opposing the action of gravity on the circulating particles, cooling the particles selectively removed, out of substantial contact with the product gas phase, subsequently and substantially immediately mixing the fraction of the gas stream which passes through the arc with the remainder which by-passes same to produce additional decomposition of said remainder including the formation of non-gaseous products in finely divided form, separating the finely divided substance from ambient gas without substantial removal of heat and cooling the separated non gaseous phase out of substantial contact with the product gas phase.

14. The process of claim 1 in which the decomposable gas phase is substantially composed of titanium tetraiodide and the discrete particles are substantially composed of titanium.

15. The process of decomposing a gaseous phase containing a compound of the group which consists of boron trichloride, silicon tetrachloride, silicochloroform, titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, and tungsten hexachloride, in the presence of discrete particles of matter substantially composed of the element which is in chemical combination with halogen in the selected gaseous phase, which comprises the steps of forming a suspension of said discrete particles in a flowing stream of said gaseous phase, directing a portion of the suspension through an electric arc, regulating the energy input to the said electric arc to heat the particles and ambient gas phase above the temperature of substantial decomposition of said gas phase, forcing at least a portion of the total number of heated particles to circulate from the zone of the arc through cooler gas which has by-passed the said arc zone and back to the said arc zone without substantial recirculation of gas phase directly heated by the said arc, substantially immediately commingling gas phase which has passed through the arc with gas phase which has by-passed said arc to produce additional decomposition including precipitation of non-gaseous components, separating the two phases without substantial cooling and subsequently cooling both of the separated phases.

16. The process of claim 15 in which the gaseous phase which is treated contains substantial volume proportions of free hydrogen together with the selected halogen containing compound.

17. The process of claim 1 in which the decomposable gas phase contains hydrogen and at least two decomposable metal halides which deposit together on the discrete particles.

18. The process of claim 3 in which the decomposable gas phase is substantially composed of hydrogen, a hydrocarbon containing gas and at least one decomposable halide salt of a metal and the particles contain the carbide of said metal.

19. The process of producing metal carbides by the action of an electric arc on a mixture of vapors of a chemical compound of said metal other than a carbide together with hydrogen and a hydrocarbon containing gas which is substantially free of oxygen, which comprises the steps of, continuously forming said gas phase of predetermined composition, continuously feeding the mixture into a gas confining chamber to produce vortical flow, introducing solid particles containing a selected metal carbide, at a regulated rate, said particles having a predetermined size range, whereby a substantial fraction of said particles centrifugate, congregate discretely, and circulate in suspension about the axis of the vortex in an outer zone thereof, maintaining a substantial part of at least one electric arc in said outer zone of said vortex to heat and react the two phases and accrete metal carbide from the gas phase of the surface of said particles, and selectively removing the incremented particles from the zone of circulation.

20. In an apparatus of the character described, means to inject a gas phase into a plenum chamber in a gas confining space, an axial gas outlet, multiple jets positioned about the said outlet and in communication with said plenum chamber, said jets being adapted to cause the gas flowing from the plenum chamber to the aforesaid outlet to form a vortex, means to introduce solid particles substantially continuously into said vortex at an outer zone thereof, means to initiate and maintain at least one electric arc between terminals positioned to maintain said arc substantially in said outer zone of said vortical gas flow, an annular orifice in the base of the chamber in which the gas vortex is induced, whereby a gas may be blown upward into said vortical flow induced by adjacent multiple jets aforesaid, means to adjust the velocity of said upward flow of gas phase to selectively counteract the effect of gravity acting upon particles which centrifugate and congregate discretely in said outer zone of said vortex whereby large particles pass downward through said annular orifice against the upward flow of gas and smaller particles are retained in suspension and in equilibration of the forces of gravity and centrifugal force and upward viscous drag and inward viscous drag of the gas flow, means to rapidly reduce the temperature of the particles which pass downward through the aforesaid annular orifice, means to separate particles in fine subdivision which spiral inward through the axial outlet pipe from the gas phase which suspends same, and means to cool the two aforesaid phases rapidly and out of substantial contact with each other.

21. The process of retaining particles in a closed re-circulation path through space at least partially between the terminals of an electric arc by centrifugal forces generated by the non-recirculating flow of a heat alterable gas phase, ambient to said particles, to differentially heat the gas and particles and conjoin a non-gaseous product of alteration of the gas phase with the circulating particles.

References Cited in the file of this patent

UNITED STATES PATENTS

| | | |
|---|---|---|
| 729,008 | Sutton et al. | May 26, 1903 |
| 729,009 | Sutton et al. | May 26, 1903 |
| 1,046,043 | Weintraub | Dec. 3, 1912 |
| 1,173,012 | Meyer et al. | Feb. 22, 1916 |
| 1,812,357 | Mills | June 30, 1931 |
| 1,940,308 | Kelly | Dec. 19, 1933 |
| 2,084,978 | Seil | June 22, 1937 |
| 2,226,525 | Dolan | Dec. 24, 1940 |
| 2,551,341 | Sheer | May 1, 1951 |
| 2,596,469 | Cooper | May 13, 1952 |
| 2,607,674 | Winter | Aug. 19, 1952 |
| 2,698,812 | Schladitz | Jan. 4, 1955 |
| 2,731,410 | Weir | Jan. 17, 1956 |

FOREIGN PATENTS

| | | |
|---|---|---|
| 393,092 | Great Britain | June 1, 1933 |
| 620,287 | Great Britain | Mar. 22, 1949 |
| 49,106 | Denmark | Aug. 6, 1934 |
| 54,170 | Denmark | Jan. 17, 1938 |
| 296,867 | Germany | Mar. 13, 1917 |
| 54,366 | Norway | Oct. 1, 1934 |

OTHER REFERENCES

Journal of the Electro-Chemical Society, October 1951, pp. 385, 386 and 387.